United States Patent [19]

Simioni

[11] Patent Number: 5,659,381
[45] Date of Patent: Aug. 19, 1997

[54] ENGAGEMENT DEVICE PARTICULARLY FOR LENSES OF EYEGLASSES

[75] Inventor: Luciano Simioni, Montebelluna, Italy

[73] Assignee: Killer Loop S.p.A., Pederobba, Italy

[21] Appl. No.: 352,038

[22] Filed: Nov. 30, 1994

[30] Foreign Application Priority Data

Dec. 3, 1993 [IT] Italy ................. TV93A0109

[51] Int. Cl.⁶ ................. G02C 5/14; G02C 5/00
[52] U.S. Cl. ................. 351/120; 351/116; 351/140
[58] Field of Search ................. 351/154, 153, 351/148, 149, 120, 115, 111, 110, 140, 106, 103, 86, 83, 41, 44

[56] References Cited

U.S. PATENT DOCUMENTS

| | | |
|---|---|---|
| 3,846,018 | 11/1974 | Gerson . |
| 3,907,410 | 9/1975 | Richmond, Jr. .......... 351/119 |
| 5,357,292 | 10/1994 | Wiedner ................. 351/105 |

FOREIGN PATENT DOCUMENTS

| | | |
|---|---|---|
| 0804309 | 1/1969 | Canada ................. 351/120 |
| 0206109 | 12/1986 | European Pat. Off. . |
| 0571765 | 12/1993 | European Pat. Off. . |
| 2268276 | 11/1975 | France . |
| 9201502 | 5/1992 | Germany . |

*Primary Examiner*—Hung X. Dang
*Attorney, Agent, or Firm*—Guido Modiano; Albert Josif; Daniel O'Byrne

[57] ABSTRACT

The engagement device has a first seat having a longitudinal extension and formed in a first end of a lens of a pair of eyeglasses. A second seat, also formed in the first end of the lens, has an essentially circular configuration and communicates with the first seat. The engagement device also has a longitudinal bridge connected to a second end of a temple and a cylinder connected to the bridge. The bridge and the cylinder are interposed transversely between two wings formed at the second end of the temple. The bridge is accommodated in the first seat and the cylinder is accommodated in the second seat. The walls laterally delimiting the first seat may be manufactured at mutually different angles to each other according to the desired angle of the lens with respect to the temple.

15 Claims, 6 Drawing Sheets

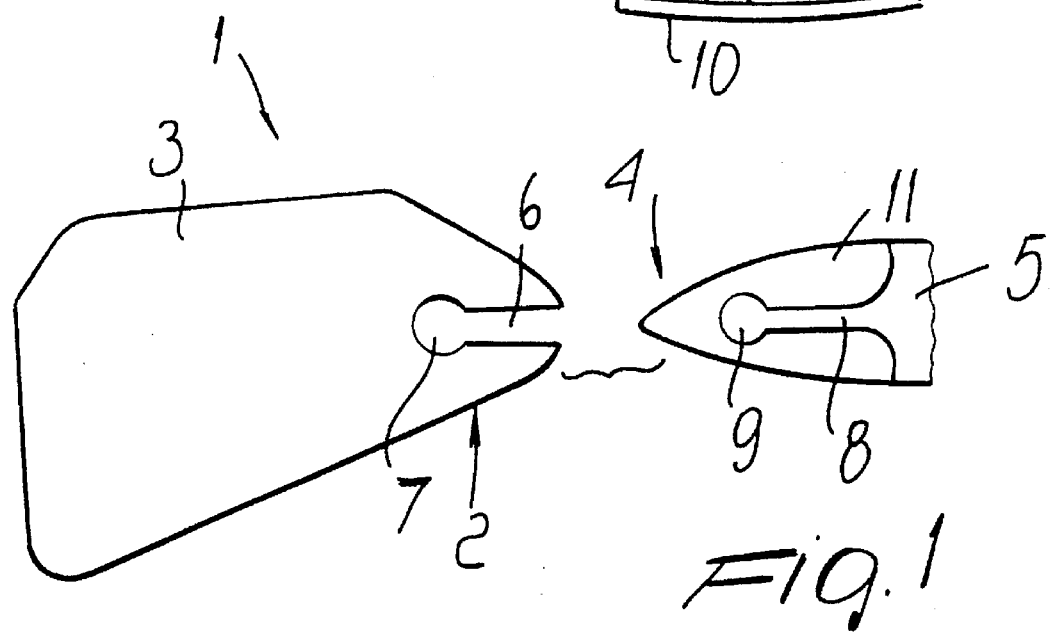
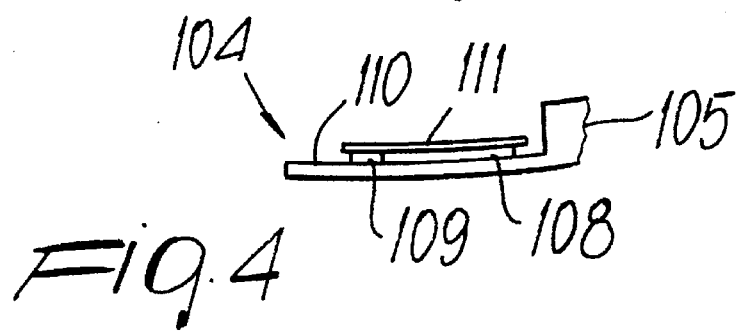
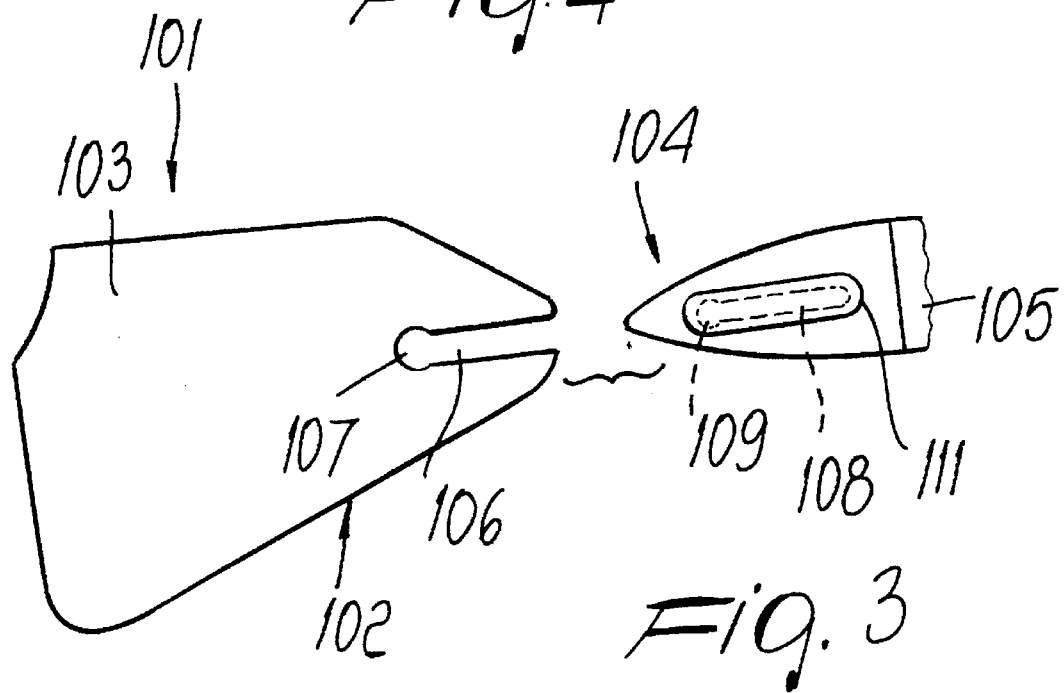

ENGAGEMENT DEVICE PARTICULARLY FOR LENSES OF EYEGLASSES

BACKGROUND OF THE INVENTION

The present invention relates to an engagement device particularly for at least one lens of a pair of sunglasses or spectacles.

Eyeglasses are currently constituted by a front that supports a single lens or a pair of lenses; hinges for connection to temples are associated with the ends of said front.

It is thus known to manufacture hinges which are constituted by two elements which are mutually associated so that they can rotate with respect to each other and the free ends of which can be embedded for example in the temple and in the front or are obtained or formed directly at the ends of said temple and said front.

The manufacture and use of these conventional eyeglasses entails high manufacturing costs and drawbacks, such as the need to provide appropriate seats on the front to associate the lenses therewith by deforming said front or by using coupling screws, with consequent difficulty in lens replacement.

The use of these conventional eyeglasses furthermore forces, during their design, to determine a preset position of the lens with respect to the temples and therefore with respect to the facing surface of the user's face; in other words, it is necessary to preset the pantoscopic angle without being able to modify it in any way.

SUMMARY OF THE INVENTION

The aim of the present invention is therefore to solve the described technical problems, eliminating the drawbacks of the prior art and thus providing a pair of eyeglasses in which it is possible to rapidly and easily assemble the lens or lenses to the remaining parts that constitute the pair of eyeglasses to allow better industrialization.

Within the scope of the above aim, an important object is to provide a pair of eyeglasses that allows to simply and quickly interchange its individual components without using particular tools.

Another important object is to provide a pair of eyeglasses that allows to vary the pantoscopic angle according to specific requirements of the manufacturing process or of the user.

Another object is to provide a device that associates with the preceding characteristics that of being reliable and safe in use and has low manufacturing costs.

With the foregoing and other objects in view, there is provided an engagement device, particularly for at least one lens of a pair of sunglasses or spectacles, characterized in that it comprises means for temporary engagement between at least one end of said lens and the corresponding end of a temple or of a front, said means allowing to preset or vary the pantoscopic angle of said at least one lens.

BRIEF DESCRIPTION OF THE DRAWINGS

Further characteristics and advantages of the invention will become apparent from the detailed description of some particular but not exclusive embodiments, illustrated only by way of non-limitative example in the accompanying drawings, wherein:

FIG. 1 is a partially sectional side view of an end of a lens and of the corresponding end of a temple or of a front or of a support that can be connected to the front;

FIG. 2 is a top view of the end of the temple or of the front or of the support to be connected to the lens or lenses;

FIG. 3 is a view, similar to FIG. 1, of another embodiment;

FIG. 4 is a view, similar to FIG. 2, of the end of the temple or of the front or of the support to be connected to the lens or lenses;

DESCRIPTION OF THE PREFERRED EMBODIMENTS

Figure 5:
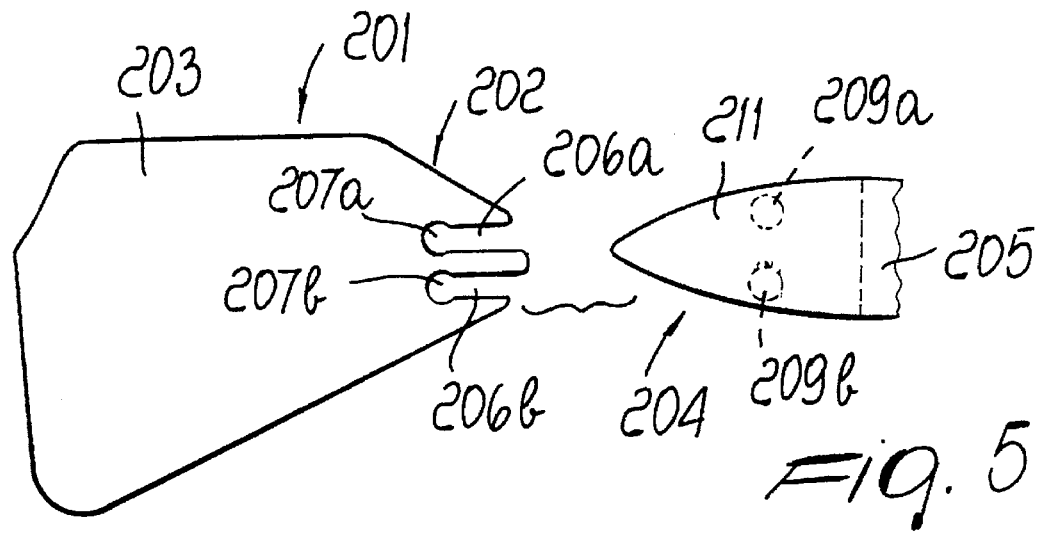
FIG. 5 is a view, similar to FIG. 1, of another embodiment.

With reference to the above figures, the reference numeral 1 designates the engagement device, which is particularly usable to mutually connect at least one first end 2 of a lens portion 3 of a pair of sunglasses or spectacles and a second end 4 of a frame portion 5. As used herein, the term "lens portion" refers to a single lens or to a pair of lenses. Moreover, as used herein, the term "frame portion" refers to a temple, to a front, or to a support which is associated or associable to a front.

The device comprises means to allow temporary mutual engagement of said first and second ends; said means are constituted by a first seat 6 which is formed longitudinally with respect to said first end 2 and is connected to a second seat 7 which advantageously has a circular plan.

Complementarily shaped temporary securing elements can be arranged at said first and second seats and are constituted by a longitudinal bridge 8 and by a cylinder 9 which are interposed transversely between two wings 10 and 11 formed at the second end 4 of the frame portion.

The functions of said bridge, cylinder, first seat, and second seat are to connect the lens portion 3 to the frame portion 5 and to allow to vary the inclination of the lens or lenses of the lens portion 3 with respect to said frame portion.

These functions are allowed by the shape of the cylinder 9 and of the second seat 7, whereas the pantoscopic angle and, accordingly, the angle that forms approximately between the planes of arrangement of the lens or lenses and of the user's face are determined by the shape of the first seat 6.

This angle is determined, for the illustrated embodiment, during the manufacture of the pair of eyeglasses, in that it is preset by the manufacturer.

The pantoscopic angle can furthermore be changed directly by the user: for example, if the first seat 6 is shaped like a truncated cone with its apex directed away from the first seat, then the lens 3 can be given a desired upward or downward tilt according, e.g., to a specific sports practice.

For example, in fact, in cycling the cyclist leans more or less towards the handlebar depending on whether he is performing a time trial or racing; this position forces him to rotate his eyes upward in order to see the track.

The possibility to vary the angular position of the lens thus allows the cyclist to see the track in optimum conditions, as the airflow correctly strikes the surface of the lens instead of the cyclist's eyes.

It has thus been observed that the device according to the invention has achieved the intended aim and objects, it is possible to rapidly and easily correctly assemble the lens or lenses for example to the front even without using particular tools and accordingly replace the lens or lenses in an equally rapid and easy manner.

Furthermore, the possibility to vary the pantoscopic angle allows the user to practice his sport in an optimum manner as the conditions of said sport vary.

The device according to the invention is of course susceptible to numerous modifications and variations, all of which are within the scope of the same inventive concept.

Thus, for example, FIGS. 3 and 4 illustrate a device 101 in which the second end 104 of the frame portion 105 comprises temporary securing elements which are constituted by a longitudinal bridge 108 that ends, towards the lens portion 103, with a cylinder 109; said securing elements are interposed transversely between a first wing 110, which is formed at the second end 104, and a second wing 111, which is arranged parallel to the first wing and is directly associated with the cylinder and with the bridge.

In this embodiment, too, said securing elements interact with means that allow to temporarily engage the second end 104 with the first end 102 of a lens portion 103; said means are constituted by a first seat 106 which is formed longitudinally with respect to said first end 102 and is connected to a second seat 107 which is advantageously shaped complementarily to the cylinder 109.

In this case, too, it is possible to obtain the desired pantoscopic angle during the manufacture of the pair of eyeglasses.

Figure 6:
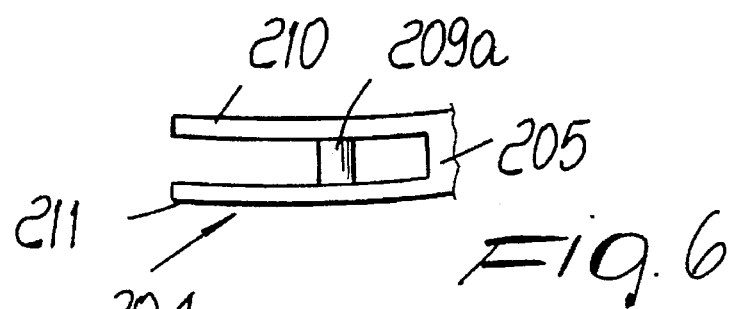
FIG. 6 is a view, similar to FIG. 2, of the end of the temple or of the front or of the support to be connected to the lens or lenses.

FIGS. 5 and 6 illustrate another embodiment, constituted by a device 201 in which two first seats 206a and 206b are formed at the first end 202 lens portion 203, are arranged longitudinally with respect to said first end 202 and parallel to each other, and are connected to two second seats 207a and 207b which have an essentially circular plan.

Complementarily shaped temporary securing elements interact with said pairs of first and second seats and constitute means for temporary engagement between said first end 202 and a second end 204 of a frame portion 205; said securing elements are constituted by two cylinders 209a and 209b which are arranged transversely between the wings 210 and 211 formed at the second end 204.

The center distance between the cylinders 209a and 209b, which are preferably arranged at a same plane that lies transversely to the wings 210 and 211, is equal to the center distance between the pair of first seats 206a and 206b.

in this case, too, it is possible to achieve, during manufacture, the desired pantoscopic angle.

Figure 7:
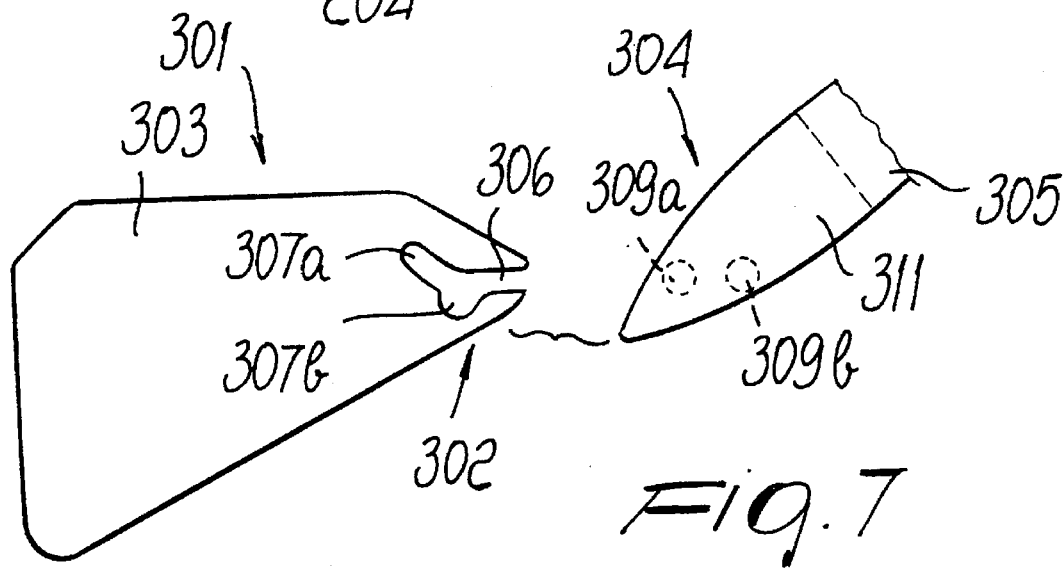
FIG. 7 is a view, similar to FIG. 1, of another embodiment.
Figure 8:
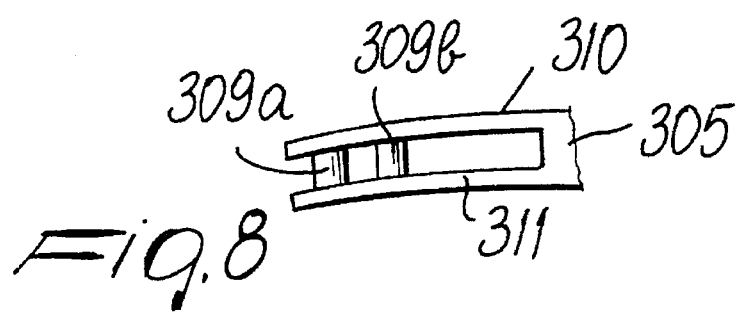
FIG. 8 is a view, similar to FIG. 2, of the end of the temple or of the front or of the support to be connected to the lens or lenses.

FIGS. 7 and 8 illustrate another embodiment of a device 301 which has, at a first end 302 of a lens portion 303, means for temporary coupling to a second end 304 of a portion 305 or of a front or of a support which is associated or associable with said front.

Said coupling means are constituted by a first seat 306 which is formed longitudinally with respect to the lens 303 at the first end 302 and is connected to two second seats 307a and 307b which respectively have a longitudinal shape arranged along an axis that is inclined with respect to the first seat 306 and an essentially circular plan in a plane that lies below the plane of arrangement of the first seat 306.

Together, the first and second seats form an essentially Y-shaped seat at the first end 302; temporary securing elements interact with said seat and are constituted by two cylinders 309a and 309b which are interposed transversely between two wings 310 and 311 formed at the second end 304.

The two cylinders 309a and 309b are arranged so as to allow to insert both of them at the first seat 306 and then, as a consequence of a rotation applied to the temple 305, to place them respectively at the second seats 307a and 307b.

In this case, too, the temple and the lens are engaged in a manner that allows to preset the pantoscopic angle.

Figure 9:
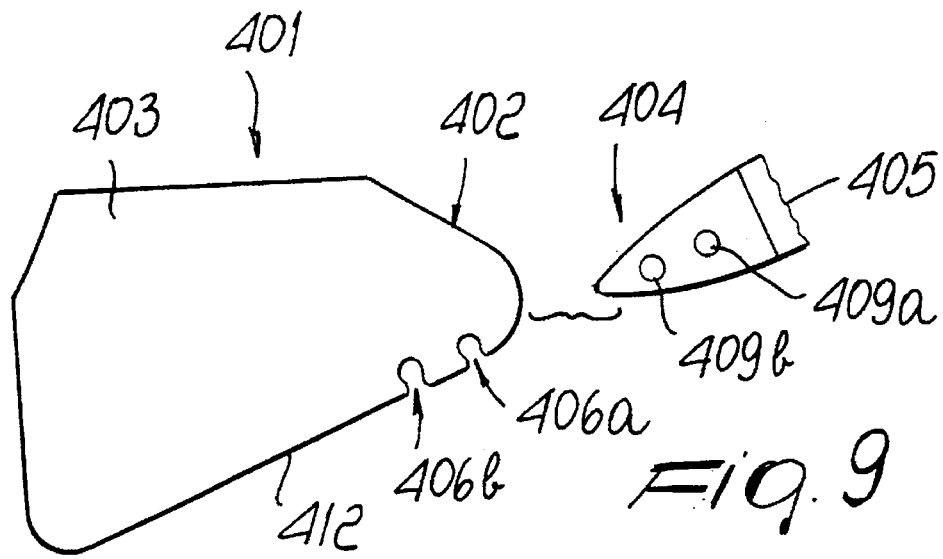
FIG. 9 is a view, similar to FIG. 1, of another embodiment.
Figure 10:
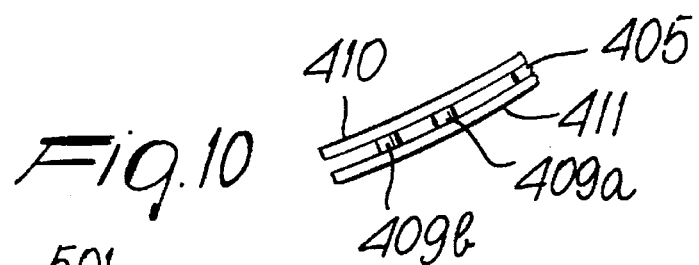
FIG. 10 is a view, similar to FIG. 2, of the end of the temple or of the front or of the support to be connected to the lens or lenses.

FIGS. 9 and 10 illustrate another embodiment of a device 401 which has, at a first end 402 of a lens portion 403, means that allow to mutually engage said first end and a second end 404 of a temple 405 or of a said first end and a second end 404 of a frame portion 405.

Said means are constituted by two first seats 406a and 406b which are formed at the lower perimetric edge 412 of the lens 403 and have an essentially circular plan.

Complementarily shaped temporary securing means can be arranged at the first seats and are constituted by two cylinders or bridges 409a and 409b which are arranged transversely between the wings 410 and 411 of the temple 405.

In this case, too, it is therefore possible to mutually couple the temple and the lens, as the center distance between the cylinders or bridges of the first seats is the same and their coupling can occur for example in a snap-together manner.

In this case, too, it is possible to obtain a desired pantoscopic angle during the manufacture of the pair of eyeglasses.

Figure 11:
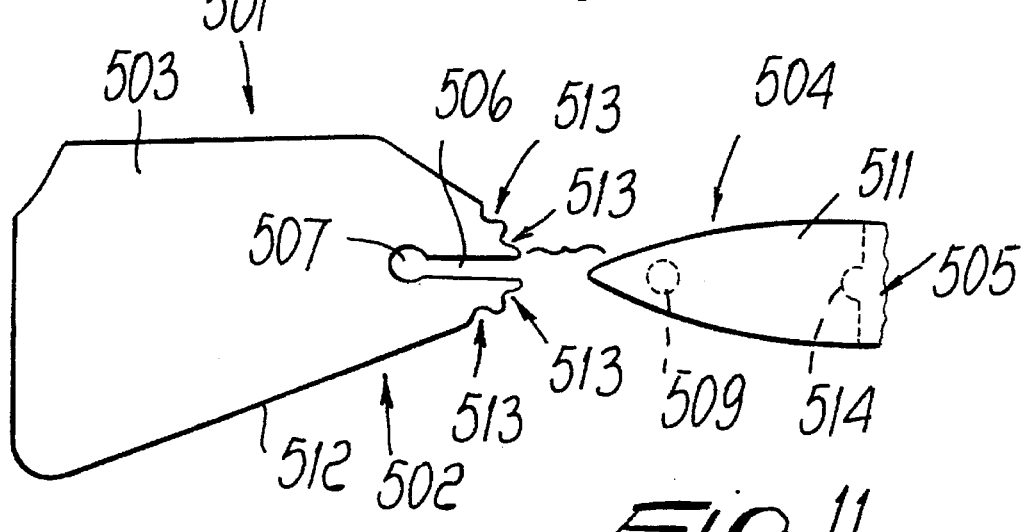
FIG. 11 is a view, similar to FIG. 1, of another embodiment.
Figure 12:
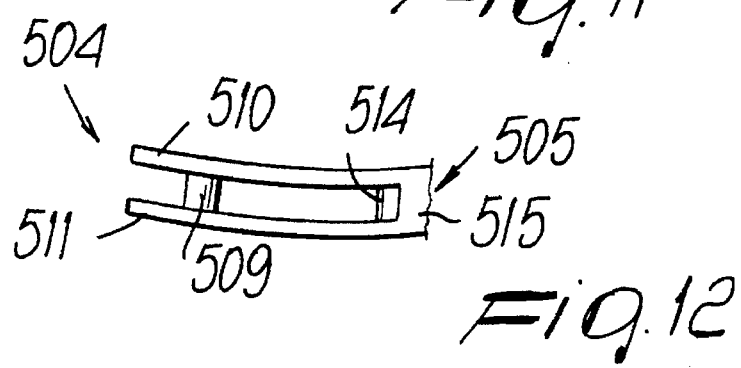
FIG. 12 is a view, similar to FIG. 2, of the end of the temple or of the front or of the support to be connected to the lens or lenses.

FIGS. 11 and 12 illustrate another embodiment for a device 501 which is constituted by a lens portion 503 which has a first end 502 that can be associated at a second end 504 of a frame portion 505.

Means for temporary engagement with the second end 504 are provided at the first end 502 and are constituted by a first seat 506 which is formed longitudinally with respect to the first end 502 and is connected to a second seat 507 which advantageously has a circular plan.

Multiple preferably semicircular third seats 513 are furthermore formed at the perimetric edge 512 of the lens 503 that is adjacent to the first seat 506.

Complementarily shaped temporary securing elements interact with said first, second, and third seats and are constituted by a bridge or cylinder 509, which is interposed transversely between the wings 510 and 511 formed at the second end 504 and at the temple 505, and by a lug 514 which protrudes from the base 515 that connects the wings 510 and 511.

The center distance between the bridge or cylinder 509 and the lug 514 is approximately equal to the center distance between the second seat 507 and the third seats 513; this allows not only to mutually engage the two parts of the pair of eyeglasses but also to vary the pantoscopic angle, as the user can vary the arrangement of the lug 514 in one of the several third seats 513.

Figure 13:
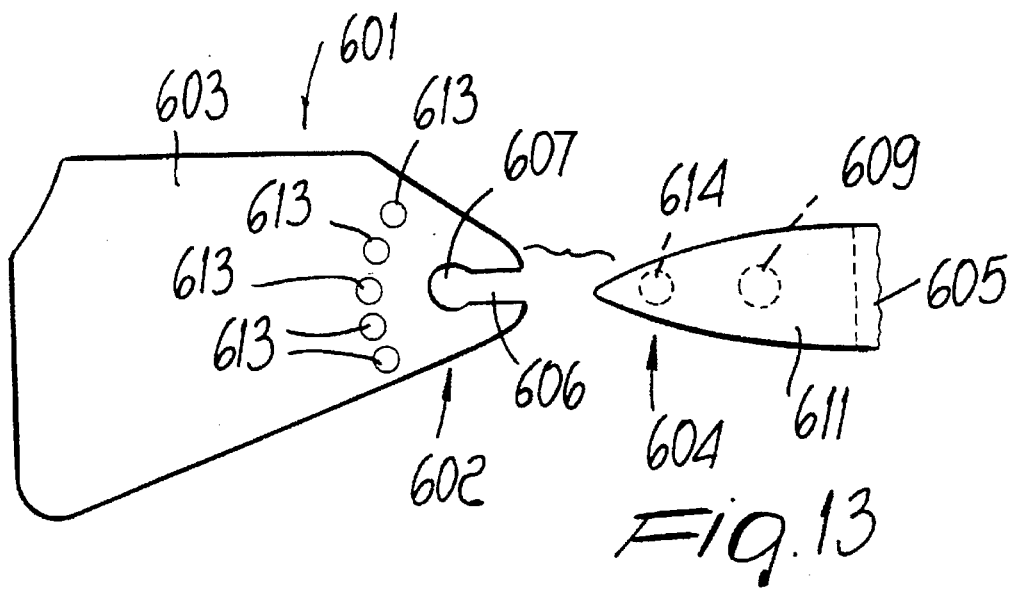
FIG. 13 is a view, similar to FIG. 1, of another embodiment.
Figure 14:
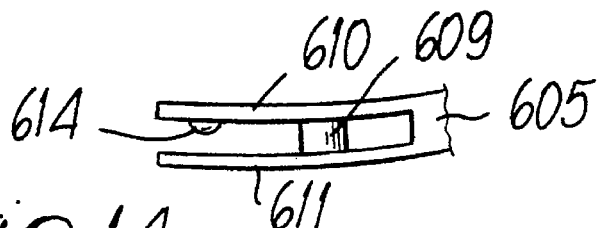
FIG. 14 is a view, similar to FIG. 2, of the end of the temple or of the front or of the support to be connected to the lens or lenses.

FIGS. 13 and 14 illustrate another engagement device 601 which is suitable to mutually connect a first end 601 of a lens portion 603 of a pair of sunglasses or spectacles and a second end 604 of a frame portion 605.

Said device comprises means that allow to temporarily mutually engage the first and second ends; said means are constituted by a first seat 606 which is formed longitudinally with respect to the first end 602 and is connected to a second seat 607 which preferably has a circular plan.

Said means furthermore comprise third seats 613 which are formed at the inner and/or outer lateral surface of the lens 603, partially affect its thickness, and are arranged along a circular arc which is centered approximately in the second seat 607.

Complementarily shaped temporary securing elements can be arranged at said first, second, and third seats and are constituted by a bridge or cylinder 609, which is interposed transversely between the wings 610 and 611 formed at the second end 604 of the temple, and by a lug 614, which protrudes from the inner lateral surface of one of said wings 610 and 611 at a distance from the bridge or cylinder 609 that causes it to affect one of the third seats 613.

This embodiment, too, therefore allows not only to mutually engage two components of the pair of eyeglasses but also allows the user to modify the pantoscopic angle.

Figure 15:
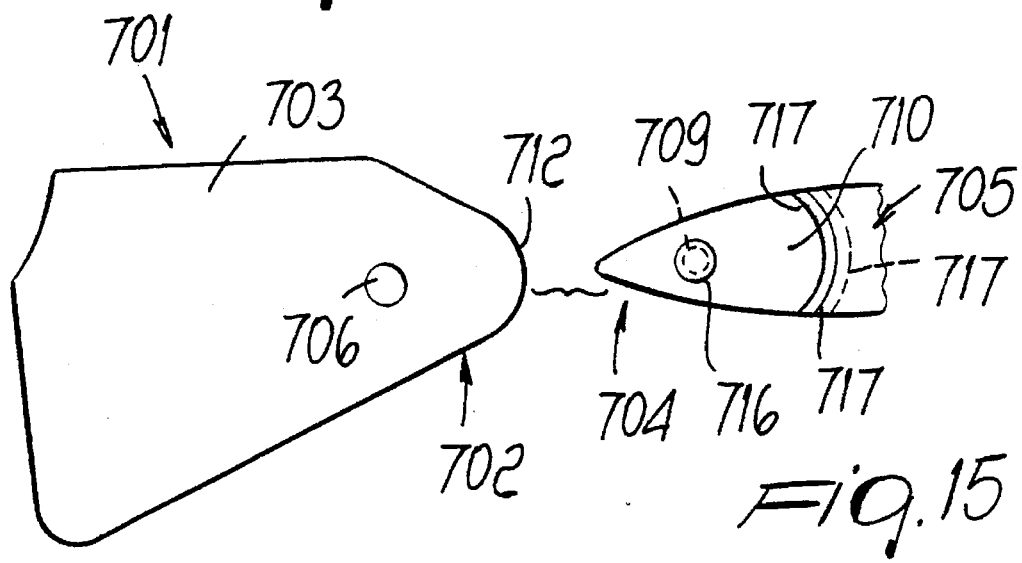
FIG. 15 is a view, similar to FIG. 1, of another embodiment.
Figure 16:
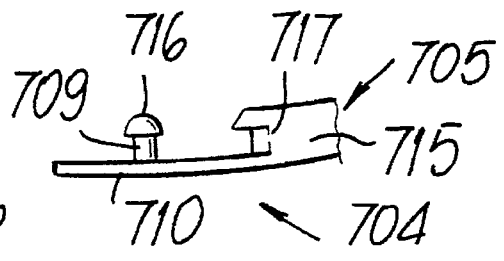
FIG. 16 is a view, similar to FIG. 2, of the end of the temple or of the front or of the support to be connected to the lens or lenses.

FIGS. 15 and 16 illustrate another embodiment of a device 701 which can be used to mutually connect a first end 702 of a lens portion 703 of a pair of sunglasses or spectacles and a second end 704 of a frame portion 705.

Said device 701 comprises means for temporary engagement between the first end and the second end and also comprises means for varying the pantoscopic angle which are constituted by a first seat 706 that consist of a hole formed at the first end 702 of the lens 703.

A complementarily shaped temporary securing element can be detachably arranged at said seat 706 and is constituted by a cylinder 709 that protrudes from a wing 710 that forms the second end 704 of the temple 705; said cylinder 709 has a head 716 that gives it a mushroom-like shape that is elastically compressible for removable insertion within the first seat 706.

The means for varying the pantoscopic angle are constituted by multiple ridges 717 which protrude transversely from the base 715 of the temple 705 from which the wing 710 protrudes.

Said ridges 717 are shaped like an arc that is centered approximately at the axis of the cylinder 709.

The center distance between the first one of said ridges 717 and the cylinder 709 is equal to the distance between the axis of the first seat 706 and the perimetric edge 712 of the lens 703, whereas the other ridges are arranged gradually further away from the cylinder 709, so as to allow the perimetric edge 712 of said lens to interact with one of said ridges when the temple is rotated with respect to the lens.

A temporary position of the lens with respect to the temple is thus produced, providing the desired pantoscopic angle.

Figure 17:
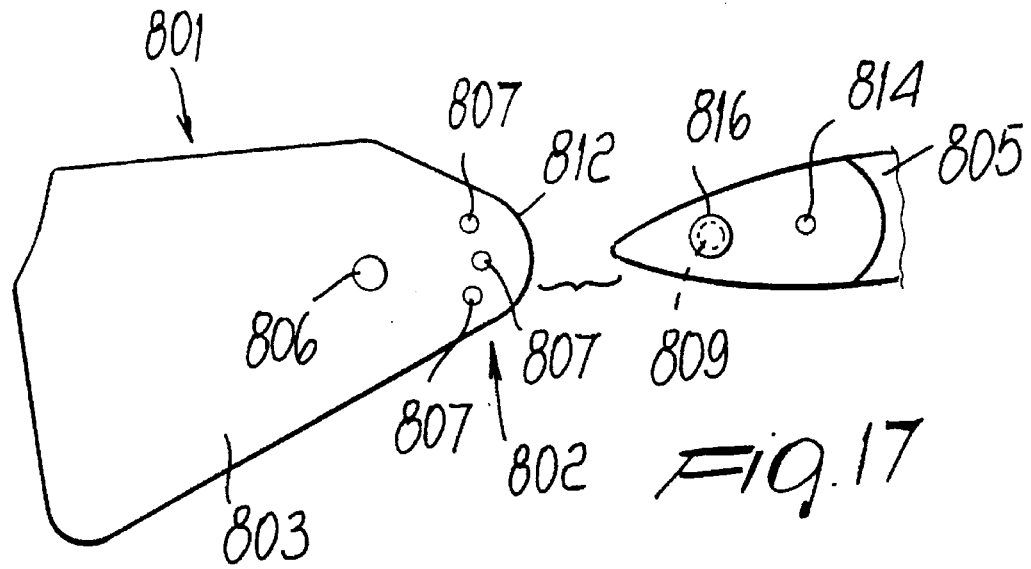
FIG. 17 is a view, similar to FIG. 1, of another embodiment.
Figure 18:
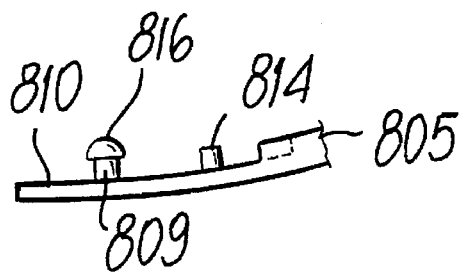
FIG. 18 is a view, similar to FIG. 2, of the end of the temple or of the front or of the support to be connected to the lens or lenses.

FIGS. 17 and 18 illustrate another embodiment of an engagement device 801 which can be used particularly to mutually connect at least one first end 802 of a lens portion 803 of a pair of sunglasses or spectacles and a second end 804 of a frame portion 805.

The device comprises means that allow temporary engagement between the first end and the second end, as well as means for varying the pantoscopic angle; said means are constituted by a first seat 806, which is constituted by a through hole formed on the lens 803 at the first end 802, and by second seats 807, which partially affect the thickness of the lens and are formed at the inner and/or outer surface thereof in the interspace between the first seat 806 and the perimetric edge 812 of said lens.

Advantageously, said second seats 807 are arranged at a circular arc that is centered on the axis of the first seat 806.

Complementarily shaped temporary securing elements can be arranged at said first and second seats and are constituted by a bridge 809 which has an elastically compressible head 816; said cylinder protrudes from a wing 810 that forms the second end 804 of the temple 805.

There is also a lug 814 which also protrudes from the wing 810 in the same direction as the cylinder 809; the center distance between the lug and the cylinder is approximately equal to the center distance between the first seat 806 and the second seat 807.

This embodiment, too, therefore allows to mutually engage two components of the pair of eyeglasses and also allows to vary the pantoscopic angle by arranging the lug 814 in the desired one of the various second seats 807.

Figure 19:
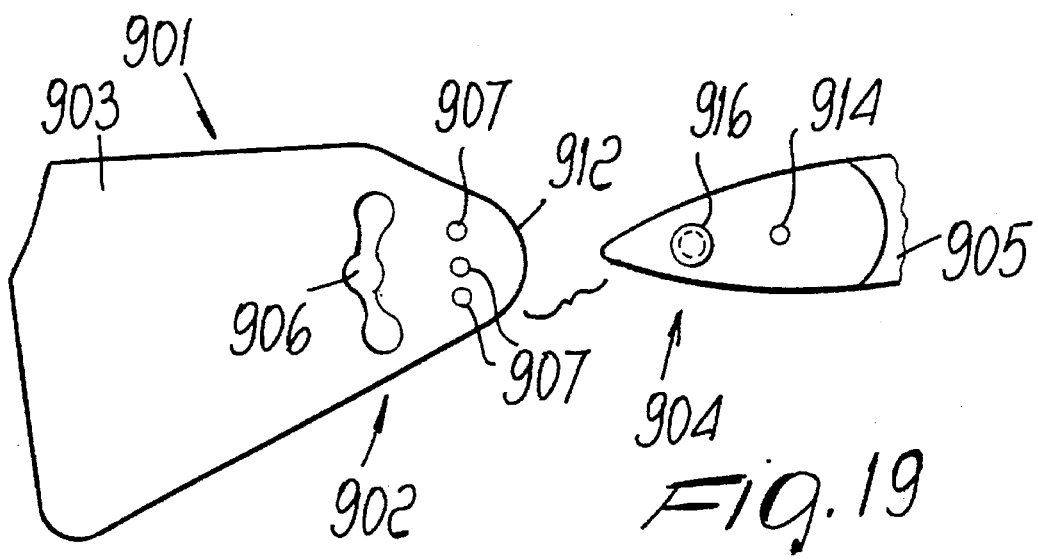
FIG. 19 is a view, similar to FIG. 1, of another embodiment.
Figure 20:
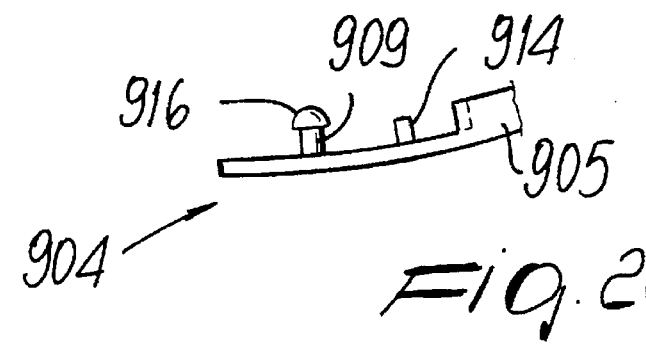
FIG. 20 is a view, similar to FIG. 2, of the end of the temple or of the front or of the support to be connected to the lens or lenses.

FIGS. 19 and 20 illustrate another embodiment of a device 901 which is particularly usable to mutually connect at least one first end 902 of a lens portion 903 of a pair of sunglasses or spectacles and a second end 904 of a frame portion 905.

The device comprises means for temporarily engaging the first and second ends as well as means for varying the pantoscopic angle; said means are constituted by a first through seat 906 which is formed at the first end 902 and is constituted by multiple preferably circular holes which are connected along a circular arc whose concavity is directed towards the perimetric edge 912 that is associable with the temple 905.

There are also second seats 907 that partially affect the thickness of the inner and/or outer lateral surface of the lens, are formed in the interspace between the perimetric edge 912 and the first seat 906, and are arranged at a same axis.

Complementarily shaped temporary securing elements can be arranged at said first and second seats and are constituted by a cylinder 909, which has a head 916 that can be compressed elastically to place it inside the first seat 906, and by a lug 914; said cylinder and said lug protrude from a wing 910 that forms the second end 904 of the temple 905.

The center distance between the bridge and the lug is approximately equal to the center distance between the first seat 906 and the second seats 907.

In this case, too, it is therefore possible to mutually associate the components of a pair of eyeglasses, varying both the position of the head 916 of the cylinder 909 within the first seat 906 and the position of the lug 914 with respect to the desired second seat 907 so as to accordingly vary the pantoscopic angle.

Figure 21:
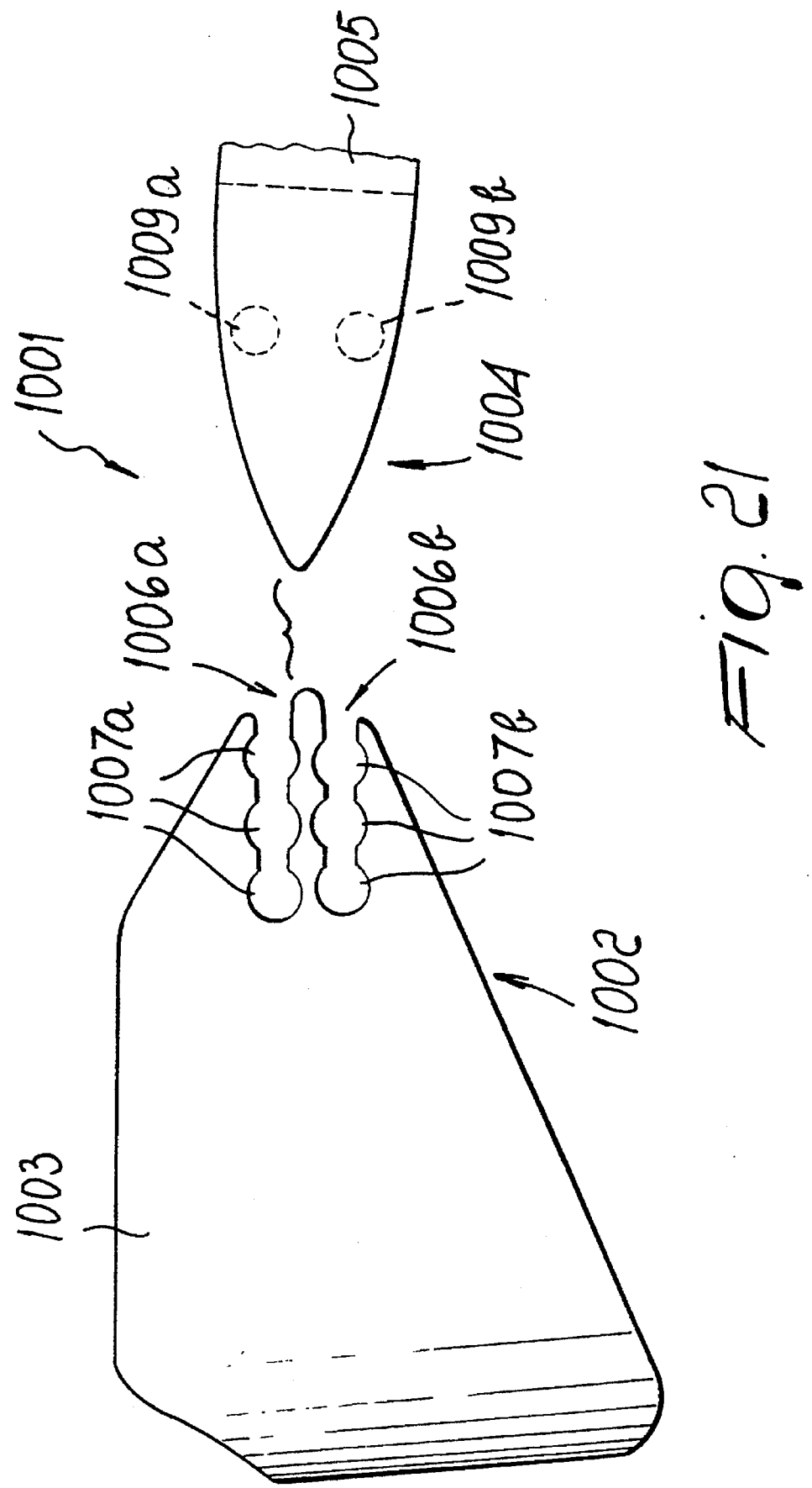
FIG. 21 is a view, similar to FIG. 5, of another solution in which the user himself can vary the pantoscopic angle.

FIG. 21 illustrates another embodiment, constituted by a device 1001 in which two first seats 1006a and 1006b are formed at the first end 1002 of the lens portion 1003 and are arranged longitudinally with respect to said first end 1002 and parallel to each other.

Said two first seats are connected to multiple pairs of second seats 1007a and 1007b which are arranged sequentially with respect to each other and have an essentially circular plan.

Complementarily shaped temporary securing elements interact with said multiple pairs of second seats, which constitute means for temporary engagement between said first end 1002 and a second end 1004 of a frame portion 1005; said securing elements are constituted by two cylinders 1009a and 1009b which are arranged transversely between the wings formed at the second end 1004.

The center distance between the cylinders 1009a and 1009b, which are preferably arranged on a same plane that lies transversely to said wings, is equal to the center distance between the two first seats 1006a and 1006b.

Depending on the position of the cylinders in the desired pair of the pairs of second seats 1007a and 1007b, it is possible to connect the elements that constitute the pair of eyeglasses, furthermore varying the useful length of the temple; if instead the user places the cylinders so that they are staggered with respect to two adjacent pairs of second seats, he can change the pantoscopic angle.

For this purpose, the center distance between the pairs of second seats 1007a and 1007b is such as to also allow to simultaneously arrange the cylinders in individually different pairs of second seats.

The materials and the dimensions that constitute the individual components of the device may of course be the most pertinent according to the specific requirements.

What is claimed is:

1. An engagement device for connecting a lens portion to a frame portion of a pair of eyeglasses, comprising:

at least one engagement seat provided on a first end portion of one of said lens portion and said frame portion, said first end portion extending substantially in a first extension surface and said engagement seat extending through said first extension surface so as to be open on both sides of said first extension surface;

at least one engagement protrusion provided on a second end portion of the other one of said lens portion and said frame portion, said second end portion extending substantially in a second extension surface and said protrusion protruding from said second extension surface; and at least one open seat provided at said first end and connected to the engagement seat, said open seat forming an open channel at said first end for allowing a passage of the engagement protrusion through said open channel, said open channel extending from said engagement seat in said first extension surface and having an open end at an edge of said first end through which said engagement protrusion is able to pass;

the engagement device further comprising a first wing portion of said second end portion, said first wing portion extending in said second extension surface, the engagement device further comprising a second wing portion at said second end portion which extends in a third extension surface, said engagement protrusion extending between and being connected to said first and second wing portions, said first and second wing portions extending on opposite sides of said first end portion when said engagement protrusion is engaged in said engagement seat.

2. An engagement device for connecting a lens portion to a frame portion of a pair of eyeglasses, comprising:

at least one engagement seat provided on a first end portion of one of said lens portion and said frame portion, said first end portion extending substantially in a first extension surface and said engagement seat extending through said first extension surface so as to be open on both sides of said first extension surface;

at least one engagement protrusion provided on a second end portion of the other one of said lens portion and said frame portion, said second end portion extending substantially in a second extension surface and said protrusion protruding from said second extension surface; and at least one open seat provided at said first end and connected to the engagement seat, said open seat forming an open channel at said first end for allowing a passage of the engagement protrusion through said open channel, said open channel extending from said engagement seat in said first extension surface and having an open end at an edge of said first end through which said engagement protrusion is able to pass;

wherein the engagement protrusion is adjustably engageable in the engagement seat in a plurality of relative positions such as to allow to vary a pantoscopic angle of said lens portion with respect to said frame portion;

the engagement device further comprising a first wing portion of said second end portion, said first wing portion extending in said second extension surface, the engagement device further comprising a second wing portion at said second end portion which extends in a third extension surface, said engagement protrusion extending between and being connected to said first and second wing portions, said first and second wing portions extending on opposite sides of said first end portion when said engagement protrusion is engaged in said engagement seat.

3. The engagement device of claim 2, wherein said second and third extension surfaces are substantially parallel.

4. The engagement device of claim 2, further comprising a bridge portion extending between said first and second wing portions and being adjustably engageable in the open seat.

5. The engagement device of claim 4, wherein said bridge portion has a thickness which is less than the thickness of said open seat.

6. The engagement device of claim 2, wherein the engagement seat and the engagement protrusion have cylindrical configurations.

7. The engagement device of claim 2, further comprising engaging surfaces, separate from said engagement seat and said engagement protrusion, of the frame portion and the lens portion for releasably locking said pantoscopic angle.

8. The engagement device of claim 7, wherein said engaging surfaces are formed on at least one locking protrusion provided at one of said first and said second ends, and on a plurality of locking seats which are provided at the other of said first and said second ends and in which said locking protrusion is selectively and releasably engageable.

9. An engagement device for connecting a lens portion to a temple of a pair of eyeglasses, comprising:

at least one engagement seat provided on a first end portion of one of said lens portion and said temple; and at least one engagement protrusion provided on a second end portion of the other one of said lens portion and said temple;

wherein the engagement protrusion is adjustably engageable in the engagement seat in a plurality of relative positions such as to allow to vary a pantoscopic angle of said lens portion with respect to said temple; and wherein the engagement device further comprises a pair of wing portions of said second end portion, the engagement protrusion extending between said wing portions.

10. An engagement device for connecting a lens portion to a temple of a pair of eyeglasses, comprising:

at least one engagement seat provided on a first end portion of one of said lens portion and said temple; and at least one engagement protrusion provided on a second end portion of the other one of said lens portion and said temple;

wherein the engagement protrusion is adjustably engageable in the engagement seat in a plurality of relative positions such as to allow to vary a pantoscopic angle of said lens portion with respect to said temple;

the engagement device further comprising:

at least one open seat provided at said first end and connected to the engagement seat, said open seat forming an open channel at said first end for allowing a passage of the engagement protrusion through said open channel; and a pair of wing portions of said second end portion, the engagement protrusion extending between said wing portions.

11. The engagement device of claim 10, further comprising a bridge portion extending between said wing portions and being adjustably engageable in the open seat.

12. The engagement device of claim 11, wherein said bridge portion has a thickness which is less than the thickness of said open seat.

13. The engagement device of claim 10, wherein the engagement seat and the engagement protrusion have cylindrical configurations.

14. The engagement device of claim 10, further comprising engaging surfaces, separate from said engagement seat and said engagement protrusion, of the temple and the lens portion for releasably locking said pantoscopic angle.

15. The engagement device of claim 14, wherein said engaging surfaces are formed on at least one locking protrusion provided at one of said first and said second ends, and on a plurality of locking seats which are provided at the other of said first and said second ends and in which said locking protrusion is selectively and releasably engageable.

* * * * *